(12) United States Patent
Yang et al.

(10) Patent No.: US 8,004,738 B2
(45) Date of Patent: Aug. 23, 2011

(54) ELECTRO-WETTING DISPLAY PANEL

(75) Inventors: Syuan-Ling Yang, Kaohsiung County (TW); Yi-Hsueh Lin, Taipei County (TW); Shih-Chyuan Fan-Jiang, Taipei (TW); Chih-Hung Shih, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 12/703,205

(22) Filed: Feb. 10, 2010

(65) Prior Publication Data

US 2011/0141548 A1    Jun. 16, 2011

(30) Foreign Application Priority Data

Dec. 15, 2009 (TW) ............................. 98142945 A

(51) Int. Cl.
*G02F 1/03* (2006.01)
*G02F 1/1335* (2006.01)
*G02B 26/02* (2006.01)

(52) U.S. Cl. ........ 359/245; 359/228; 349/113; 349/114; 349/128; 349/129; 349/139

(58) Field of Classification Search .................. 359/245, 359/228, 296; 349/38, 96, 113, 114, 128, 349/129, 134, 139, 158, 187; 257/57, 59, 257/72, E21.247; 438/30, 587, 592
See application file for complete search history.

(56) References Cited

U.S. PATENT DOCUMENTS

| | | | |
|---|---|---|---|
| 6,061,112 A * | 5/2000 | Ukita et al. | 349/113 |
| 6,195,140 B1 * | 2/2001 | Kubo et al. | 349/44 |
| 6,330,047 B1 * | 12/2001 | Kubo et al. | 349/147 |
| 6,452,654 B2 * | 9/2002 | Kubo et al. | 349/114 |
| 6,862,057 B2 * | 3/2005 | Sakamoto et al. | 349/113 |
| 6,867,830 B1 * | 3/2005 | Hirota et al. | 349/96 |
| 6,963,381 B2 * | 11/2005 | Kano et al. | 349/113 |
| 7,064,799 B2 * | 6/2006 | Okamoto et al. | 349/114 |

(Continued)

FOREIGN PATENT DOCUMENTS

CN 1908794 2/2007
(Continued)

OTHER PUBLICATIONS

"First Office Action of China Counterpart Application", issued on Nov. 29, 2010, p. 1-p. 5, in which the listed references were cited.

*Primary Examiner* — Loha Ben
(74) *Attorney, Agent, or Firm* — Jianq Chyun IP Office

(57) ABSTRACT

An electro-wetting display panel including an active device array substrate, a dielectric layer, a wall structure, a first liquid containing dyes, a second liquid, and an opposite substrate is provided. The active device array substrate includes a substrate, scan lines, data lines, and pixels. The pixels are electrically connected with the scan lines and the data lines accordingly. Each pixel includes an active device, a transparent pixel electrode, and a reflective layer. The transparent pixel electrode located above the reflective layer is electrically connected with the active device. The reflective layer has a bumpy surface. The dielectric layer is disposed on the active device array substrate. The wall structure is disposed on the dielectric layer. The first liquid is disposed on the dielectric layer. The opposite substrate is disposed above the active device array substrate. The second liquid is disposed between the active device array substrate and the opposite substrate.

14 Claims, 10 Drawing Sheets

U.S. PATENT DOCUMENTS

| | | | |
|---|---|---|---|
| 7,084,849 B2 * | 8/2006 | Noguchi et al. | 345/96 |
| 7,110,070 B2 * | 9/2006 | Sakamoto et al. | 349/113 |
| 7,251,000 B2 | 7/2007 | Okumura | |
| 7,453,547 B2 * | 11/2008 | Tung et al. | 349/187 |
| 7,471,346 B2 * | 12/2008 | Tanaka et al. | 349/15 |
| 7,529,012 B2 | 5/2009 | Hayes et al. | |
| 7,671,943 B2 * | 3/2010 | Chu et al. | 349/114 |
| 2007/0127108 A1 | 6/2007 | Hayes et al. | |
| 2007/0268245 A1 | 11/2007 | Sugita et al. | |

FOREIGN PATENT DOCUMENTS

| | | |
|---|---|---|
| CN | 101373777 | 2/2009 |

\* cited by examiner

ELECTRO-WETTING DISPLAY PANEL

CROSS-REFERENCE TO RELATED APPLICATION

This application claims the priority benefit of Taiwan application serial no. 98142945, filed on Dec. 15, 2009. The entirety of the above-mentioned patent application is hereby incorporated by reference herein and made a part of specification.

BACKGROUND OF THE INVENTION

1. Field of the Invention

The present invention relates to a reflective flat panel display. More particularly, the present invention relates to an electro-wetting display panel.

2. Description of Related Art

With great advance of electronic paper (E-paper) and electronic book (E-book), the display device with features of light, thin and flexible becomes the major development trend. Most of the current E-papers are implemented with the use of the electrophoresis techniques. Also, most of the E-papers and the E-books are equipped with reflective display devices. That is, the E-papers and the E-books can display images by reflecting the external light source.

Taking the electro-wetting display panel as an exemplar, in order to reflect the external light source so that the user can successfully see the image, the reflective layer is one of the dispensable components in the electro-wetting display panel, as disclosed in US Patent Publication No. 2007/0127108. In the aforementioned Patent Publication, the reflective surface of the reflective layer is a flat reflective surface. However, the reflectivity of the reflective layer having the flat reflective surface is quite low in normal operation. Hence, how to improve the reflectivity of the electro-wetting display panel becomes one of the key techniques for manufacturing the electro-wetting display panel.

Besides, the response speed of the electro-wetting display panel depends on the moving speed of the liquid in the electro-wetting display panel. Thus, how to speed up the moving speed of the liquid in the electro-wetting display panel also becomes one of the key techniques for manufacturing the electro-wetting display panel.

SUMMARY OF THE INVENTION

The present invention provides an electro-wetting display panel in which the design of the pixel electrode can quickly drive the first liquid containing dyes to move or increase the area of the opening.

The present invention provides an electro-wetting display panel having an active device array substrate, a dielectric layer, a wall structure, a first liquid containing dyes, a second liquid and an opposite substrate. The active device array substrate comprises a substrate, a plurality of scan lines, a plurality of data lines and a plurality of pixels. Each of the pixels is electrically connected with one of the scan lines and one of the data lines correspondingly, and each of the pixels comprises an active device, a transparent pixel electrode and a reflective layer. The transparent pixel electrode is electrically connected with the active device and is located above the reflective layer, and the reflective layer has a bumpy surface. The dielectric layer is disposed on the active device array substrate, and the wall structure is disposed on the dielectric layer, and the first liquid containing dyes is disposed on the dielectric layer. Moreover, the opposite substrate is disposed over the active device array substrate and the second liquid is located between the opposite substrate and the active device array substrate.

The present invention further provides an electro-wetting display panel having an active device array substrate, a dielectric layer, a wall structure, a first liquid containing dyes, a second liquid and an opposite substrate. The active device array substrate comprises a substrate, a plurality of scan lines, a plurality of data lines and a plurality of pixels. Each of the pixels is electrically connected with one of the scan lines and one of the data lines correspondingly, and each of the pixels comprises an active device, a transparent pixel electrode and a reflective layer. The transparent pixel electrode is electrically connected with the active device and is located above the reflective layer, and the reflective layer has a bumpy surface. Also, at least a portion of the bumpy surface is arranged without being covered by the transparent pixel electrode. The dielectric layer is disposed on the active device array substrate, and the wall structure is disposed on the dielectric layer, and the first liquid containing dyes is disposed on the dielectric layer. Moreover, the opposite substrate is disposed over the active device array substrate and the second liquid is located between the opposite substrate and the active device array substrate.

According to one embodiment of the present invention, the active device array substrate includes a thin film transistor array substrate. Further, the aforementioned active devices include amorphous silicon thin film transistors or polysilicon thin film transistors.

According to one embodiment of the present invention, the active device array substrate further comprises an inter-dielectric layer, a plurality of bumps and a planar layer. The inter-dielectric layer covers the active devices, and the bumps are disposed on the inter-dielectric layer, and the reflective layer is disposed on the inter-dielectric layer to cover the bumps. The planar layer is disposed on the inter-dielectric layer to cover the reflective layer, and the transparent pixel electrodes are disposed on the planar layer, and the dielectric layer is disposed on the planar layer to cover the transparent pixel electrodes.

According to one embodiment of the present invention, the each of the transparent pixel electrodes has at least an opening to expose at least a portion of the bumpy surface. Moreover, the aforementioned opening can be, for example, a stripe opening, a round opening or a ring opening.

According to one embodiment of the present invention, the opposite substrate includes a common electrode and a black matrix layer.

According to one embodiment of the present invention, the pixels include reflective pixels or transflective pixels.

According to one embodiment of the present invention, the dielectric layer has a hydrophobic surface, the wall structure is hydrophilic, the first liquid containing dyes is a non-polar liquid, and the second liquid is a polar conductive liquid.

According to one embodiment of the present invention, the dielectric layer has a hydrophilic surface, the wall structure is hydrophobic, the first liquid containing dyes is a conductive polar liquid, and the second liquid is a non-polar liquid.

Since the reflective layer in the electro-wetting display panel of the present invention has a bumpy surface, one embodiment of the present invention is capable of improving the reflectivity of the electro-wetting display panel to obtain a relatively better display quality. Moreover, one of the embodiments of the present invention can speed up the response speed of the electro-wetting display panel by well designing the pixel electrode.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 2A' through 2F' are schematic cross-sectional views showing a method for manufacturing an electro-wetting display panel according to one embodiment of the present invention.

DESCRIPTION OF EMBODIMENTS

Figure 1:
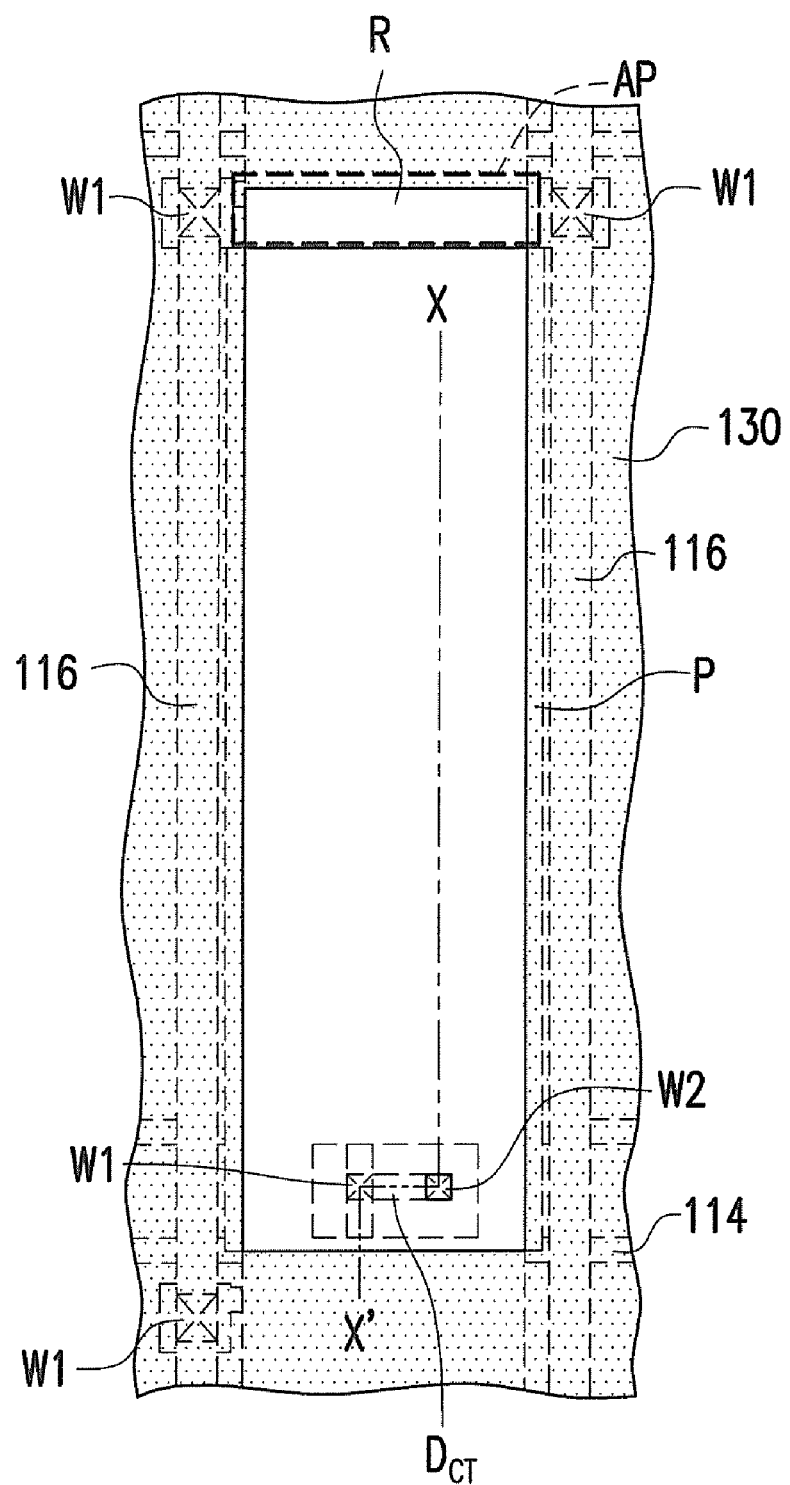
FIG. 1 and FIG. 1' are respectively a schematic top view and a schematic cross-sectional view of a single pixel in an electro-wetting display panel according to one embodiment of the present invention.
Figure 1:
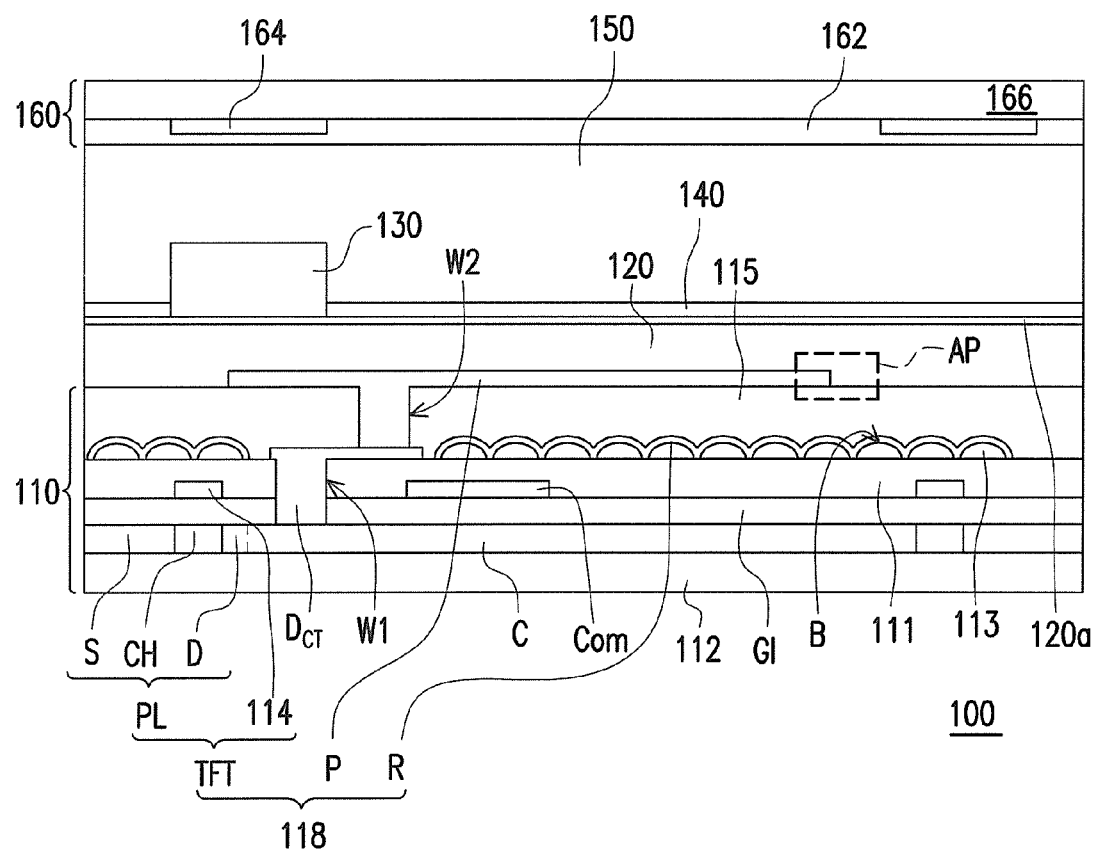

FIG. 1 and FIG. 1' are respectively a schematic top view and a schematic cross-sectional view of a single pixel in an electro-wetting display panel according to one embodiment of the present invention. Further, FIG. 1' is a schematic cross-sectional view along a line X-X' in FIG. 1.

As shown in FIG. 1 and FIG. 1', an electro-wetting display panel 100 of the present embodiment comprises an active device array substrate 110, a dielectric layer 120, a wall structure 130, a first liquid 140 containing dyes, a second liquid 150 and an opposite substrate 160. The active device array substrate 110 comprises a substrate 112, a plurality of scan lines 114, a plurality of data lines 116 and a plurality of pixels 118. Each of the pixels 118 is electrically connected with one of the scan lines 114 and one of the data lines 116 correspondingly, and each of the pixels 118 comprises an active device TFT, a transparent pixel electrode P and a reflective layer R. The transparent pixel electrode P is electrically connected with the active device TFT and is located above the reflective layer R, and the reflective layer R has a bumpy surface B. The dielectric layer 120 is disposed on the active device array substrate 110, and the wall structure 130 is disposed on the dielectric layer 120, and the first liquid 140 containing dyes is disposed on the dielectric layer 120. Moreover, the opposite substrate 160 is disposed over the active device array substrate 110 and the second liquid 150 is located between the opposite substrate 160 and the active device array substrate 110. Further, the second liquid 150 is located on the first liquid 140 containing dyes. In one embodiment of the present invention, at least a portion of the bumpy surface B is not covered by the transparent pixel electrode P.

The active device array substrate 110 can be, for example, a thin film transistor array substrate. The active devices TFT on the thin film transistor array substrate can be, for example, amorphous silicon thin film transistors or polysilicon thin film transistors. That is, the active device array substrate 110 can be a polysilicon thin film transistor array substrate (such as the substrate mentioned in the present embodiment) or an amorphous silicon thin film transistor array substrate (not shown).

Taking the polysilicon thin film transistor array substrate of the present embodiment as an exemplar, except for the substrate 112, the scan lines 114, the data lines 116 and the pixels 118, the active device array substrate 110 further comprises an inter-dielectric layer 111, a plurality of bumps 113 and a planar layer 115. The inter-dielectric layer 111 covers the active devices TFT, and the bumps 113 are disposed on the inter-dielectric layer 111, and the reflective layer R is disposed on the inter-dielectric layer 111 to cover the bumps 113. The planar layer 115 is disposed on the inter-dielectric layer 111 to cover the reflective layer R, and the transparent pixel electrodes P are disposed on the planar layer 115, and the dielectric layer 120 is disposed on the planar layer 115 to cover the transparent pixel electrodes P.

In the present embodiment, the each of the transparent pixel electrodes P has at least an opening AP to expose at least a portion of the bumpy surface B. In addition, according to the designing requirements of different products, the opening AP can be, for example, a stripe opening, a round opening, a ring opening or other opening with a suitable shape. It should be noticed that, in the present embodiment, the opening AP of the transparent pixel electrode P is, in general, the region with the reflective layer arranged thereunder and without being covered by the transparent pixel electrode P.

In the present embodiment, the opposite substrate 160 includes a common electrode 162 and a black matrix layer 164. For instance, the common electrode 162 and the black matrix layer 164 of the opposite substrate 160 can be, for example, disposed on a substrate 166, and the common electrode 162 can, for example, cover the black matrix layer 164.

In the electro-wetting display panel 100 of the present embodiment, the surface of the dielectric layer 120 can be treated to be a surface 120a with the hydrophobic characteristic or the hydrophilic characteristic. The hydrophilic-hydrophobic characteristics of the dielectric layer 120 and the wall structure 130 are different from each other. When the surface of the dielectric layer 120 is hydrophobic, the wall structure 130 should be designed to be hydrophilic and the first liquid 140 containing dyes should be the non-polar liquid (such as decane and silicon oil) and the second liquid 150 can be, for example, water or other polar liquid. Alternatively, when the surface of the dielectric layer 120 is hydrophilic, the wall structure 130 should be designed to be hydrophobic and the first liquid 140 containing dyes should be the polar conductive liquid and the second liquid 150 should be the non-polar liquid.

Figure 2A:
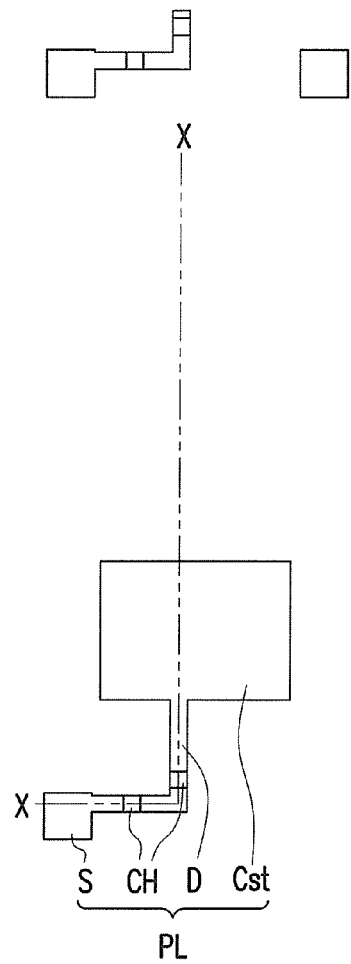
FIGS. 2A through 2F are schematic top views showing a method for manufacturing an electro-wetting display panel according to one embodiment of the present invention.
Figure 2A:
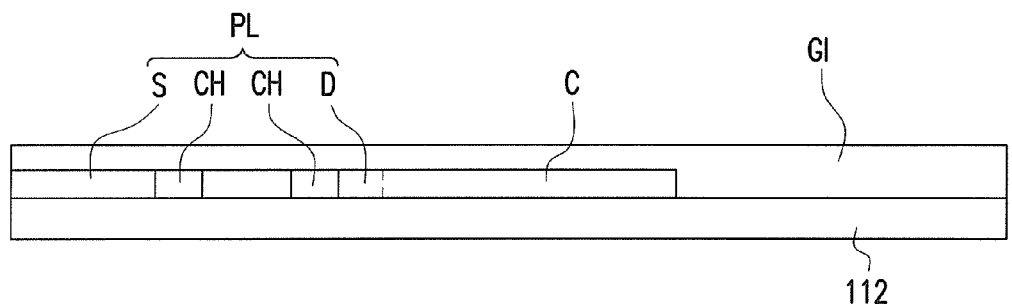

FIGS. 2A through 2F are schematic top views showing a method for manufacturing an electro-wetting display panel according to one embodiment of the present invention. FIGS. 2A' through 2F' are schematic cross-sectional views showing a method for manufacturing an electro-wetting display panel according to one embodiment of the present invention.

As shown in FIG. 2A and FIG. 2A', a patterned polysilicon layer PL is formed on a substrate 112. The patterned polysilicon layer PL can be, for example, formed by low-temperature polysilicon process (LTPS process), ion doping process and patterning process. The low-temperature polysilicon process can be, for example, the excimer laser annealing process. In detail, the patterned polysilicon layer PL can be divided into a channel region CH, a source doped region S, a drain doped region D and a storage capacitor region C. After the patterned polysilicon layer PL is formed, a gate insulating layer GI is formed on the substrate 112 to cover the patterned polysilicon layer PL.

Figure 2B:
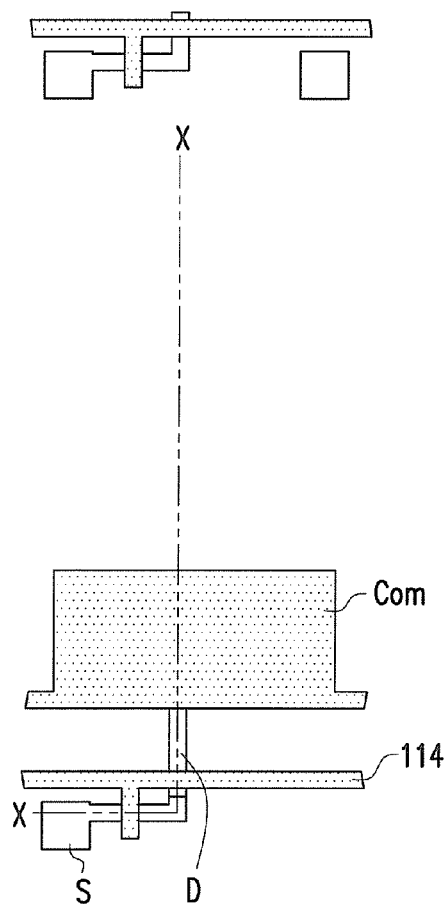
Figure 2B:
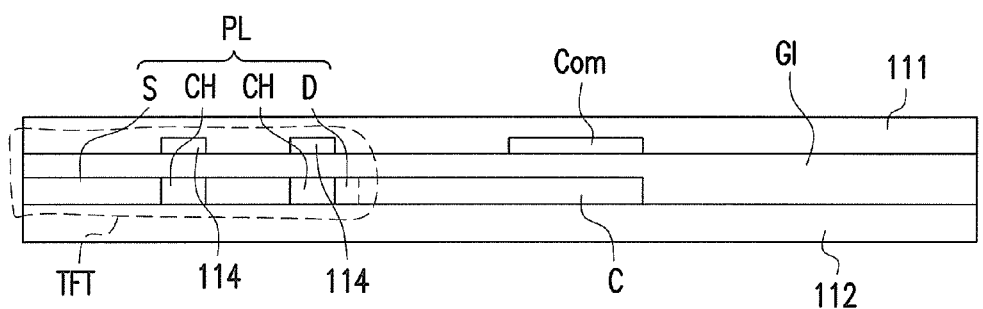

As shown in FIG. 2B and FIG. 2B', after the gate insulating layer GI is formed, the scan lines 114 and a plurality of common lines Com are formed on the gate insulating layer GI. The scan lines 114 which overlap the channel region CH is regarded as gates. It is known from FIG. 2B and FIG. 2B', the gate, the channel region CH, the source doped region S and the drain doped region D together form an active device TFT having three terminals. Further, the storage capacitor region C, the common lines Com and the gate insulating layer GI located between the storage capacitor region C and the common lines Com together form a storage capacitor Cst. After the common lines Com and the scan lines 114 are formed, the inter-dielectric layer 111 is formed on the gate insulating layer GI to cover the common lines Com and the scan lines 114.

Figure 2C:
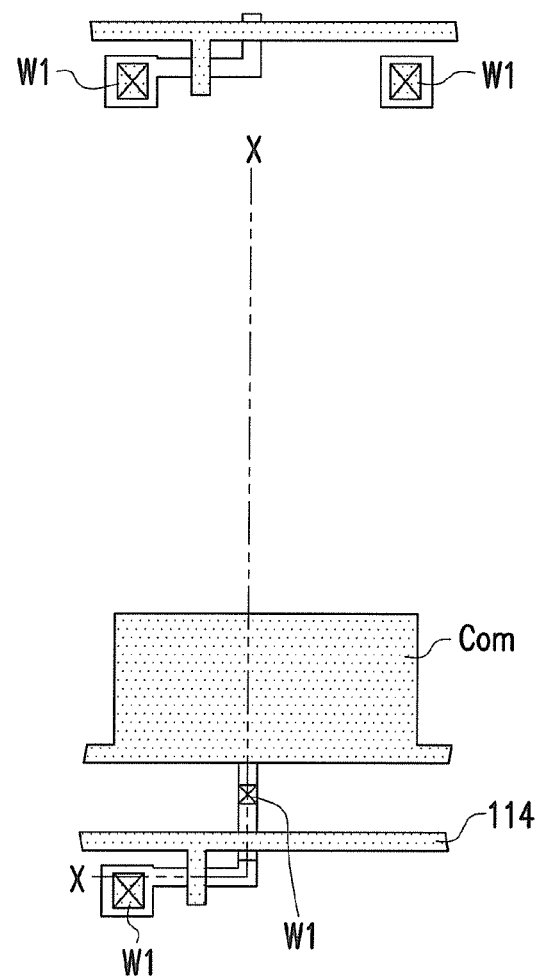
Figure 2C:
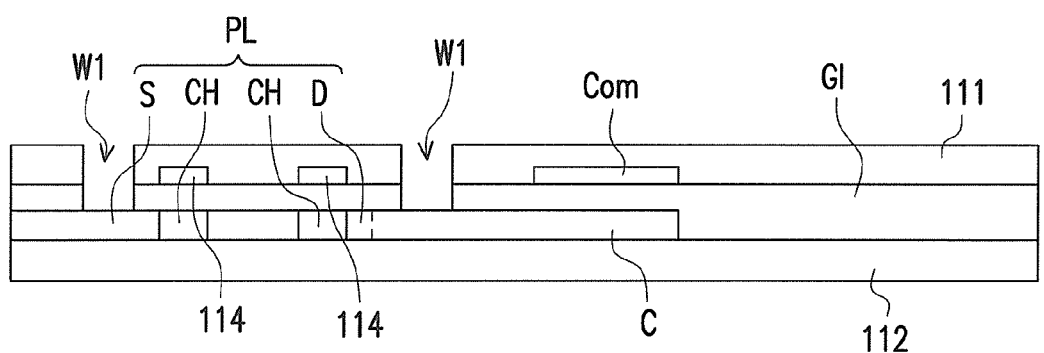

As shown in FIG. 2C and FIG. 2C', a plurality of contact windows W1 are formed in the inter-dielectric layer 111 and the gate insulating layer GI to expose the source doped region S and the drain doped region D.

Figure 2D:
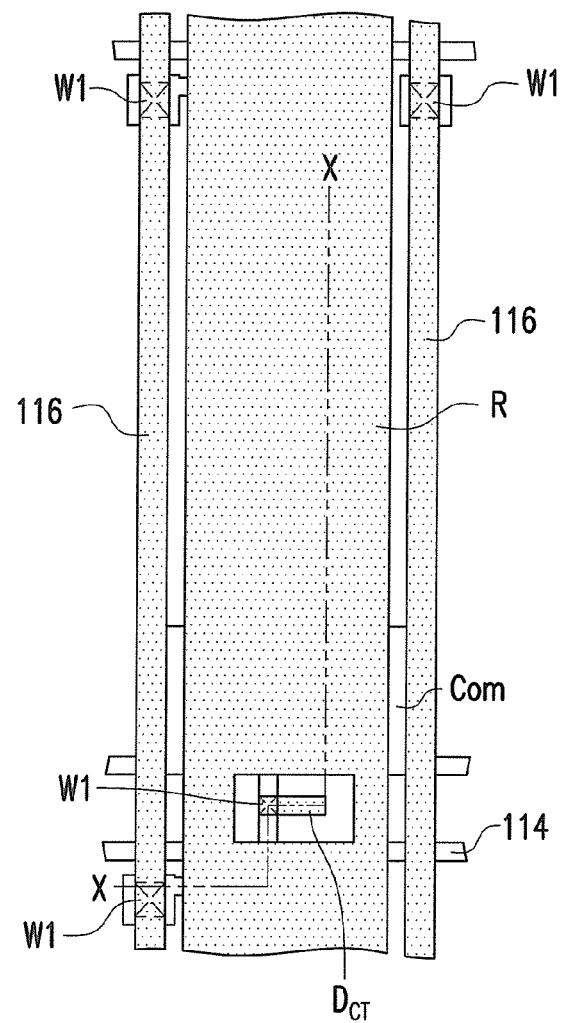
Figure 2D:
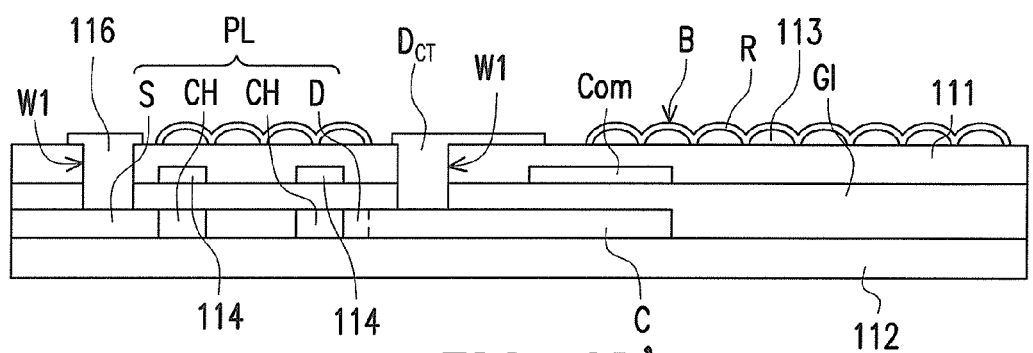

As shown in FIG. 2D and FIG. 2D', after the contact windows W1 are formed, the data lines 116, a plurality of drain connecting lines $D_{CT}$, the bumps 113 and the reflective layer R are formed on the inter-dielectric layer 111. The data lines 116 and the drain connecting lines $D_{CT}$ are electrically connected with the source doped region S and the drain doped region D respectively. The drain connecting lines $D_{CT}$ is electrically connected with the drain doped region D through the contact windows W1. For instance, the data lines 116 and the drain connecting lines $D_{CT}$ can be formed by one patterning process, and the reflective layer R can be formed by another patterning process. Alternatively, all of the reflective layer R, the data lines 116 and the drain connecting lines $D_{CT}$ can be formed by the same patterning process. It should be noticed that, before the reflective layer R is formed, the bumps 113 with predetermined height and distribution density are formed on the inter-dielectric layer 111. Hence, the later formed reflective layer R which is conformal to the bumps 113 possesses a relatively high reflectivity.

Figure 2E:
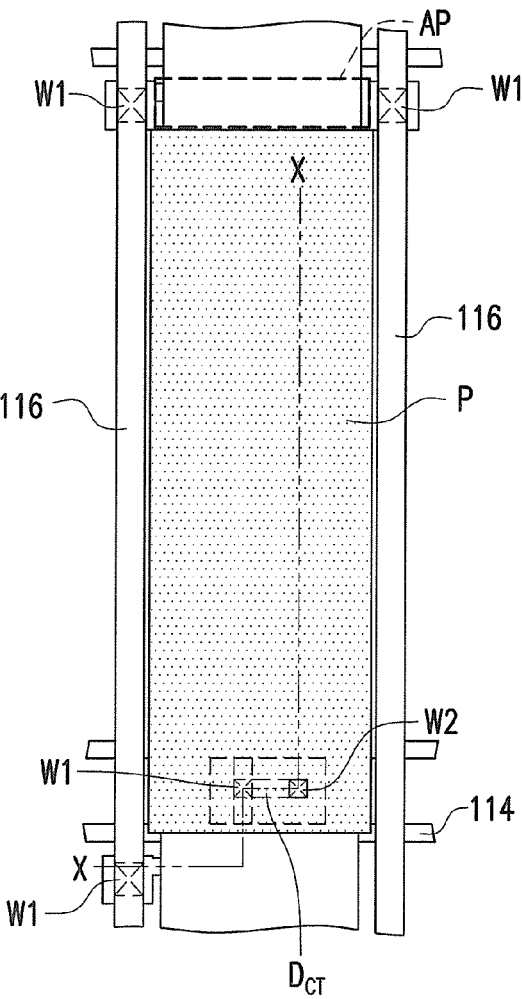
Figure 2E:
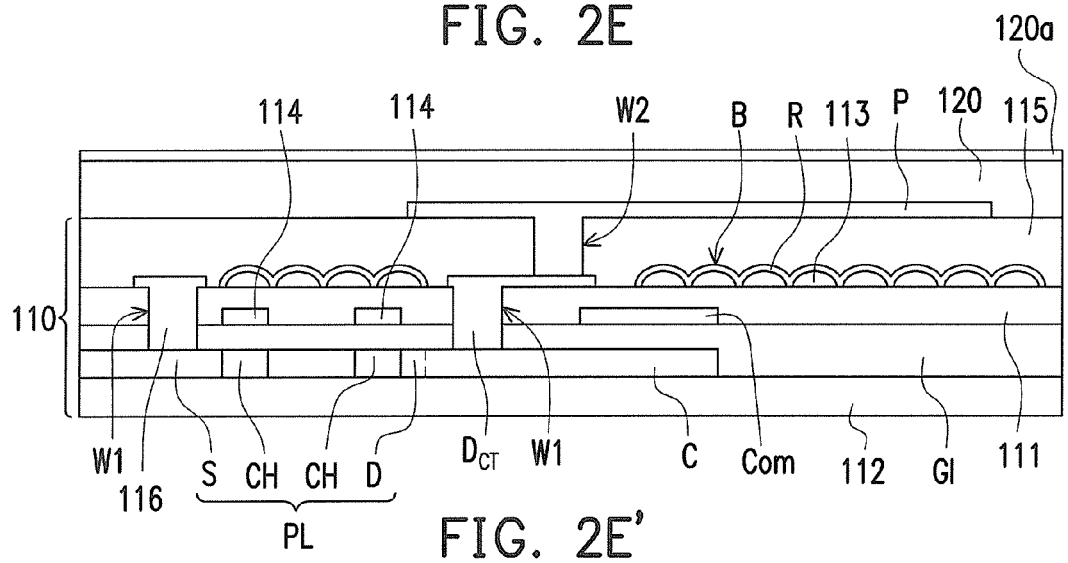

As shown in FIG. 2E and FIG. 2E', after the data lines 116, the drain connecting lines $D_{CT}$, the bumps 113 and the reflective layer R are formed, the planar layer 115 is formed to cover the data lines 116, the drain connecting lines $D_{CT}$, the bumps 113 and the reflective layer R. It is known from FIG. 2E and FIG. 2E', the planar layer 115 has a contact window W2 to expose a portion of the drain connecting lines $D_{CT}$. Then, the transparent pixel electrode P is formed on the planar layer 115. The transparent pixel electrode P is electrically connected with the drain connecting lines $D_{CT}$ through the contact window W2. It should be noticed that, after the transparent pixel electrode P is formed, the fabrication of the active device array substrate 110 is completed.

After the transparent pixel electrode P is formed, the dielectric layer 120 is formed on the planar layer 115 to cover the transparent pixel electrode P. Noticeably, the surface of the dielectric layer 120 can be a hydrophobic surface or a hydrophilic surface.

Figure 2F:
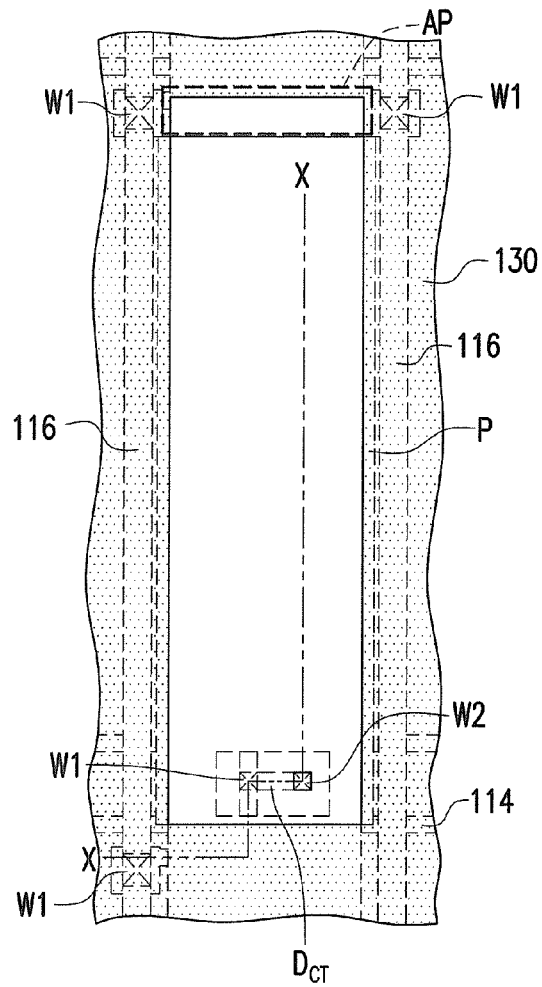
Figure 2F:
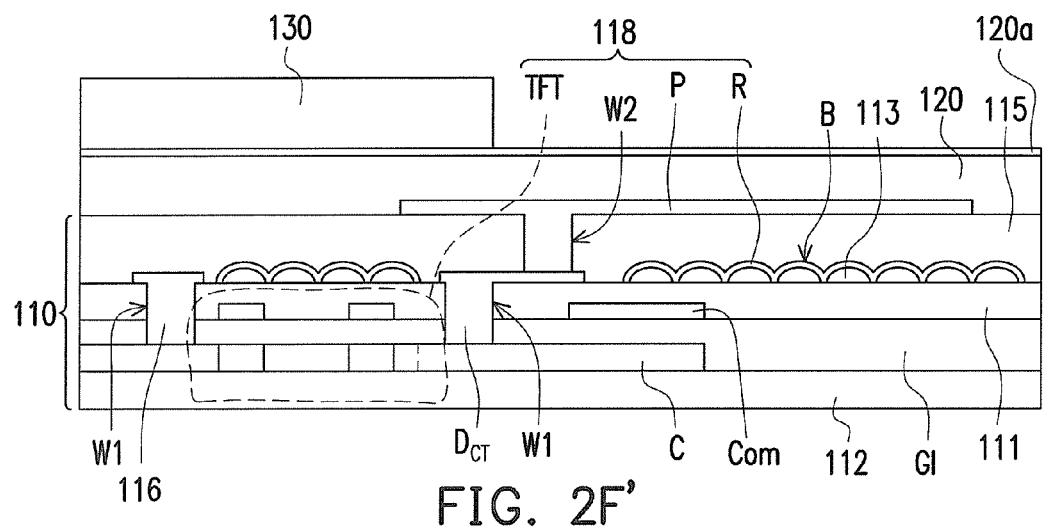

As shown in FIG. 2F and FIG. 2F', after the dielectric layer 120 is formed, the wall structure 130 is formed on the surface of the dielectric layer 120. The wall structure 130 is used to define the locations of the pixels 118. When the surface of the dielectric layer 120 is the hydrophobic surface, the wall structure 130 should be designed to be hydrophilic. Alternatively, when the surface of the dielectric layer 120 is the hydrophilic surface, the wall structure 130 should be designed to be hydrophobic.

After the process steps shown in FIGS. 2A through 2F and FIGS. 2A' through 2F' are performed, the active device array substrate 110 having the dielectric layer 120 and the wall structure 130 disposed thereon is assembled with the opposite substrate 160 in a face-to-face manner. Further, the first liquid 140 containing dyes and the second liquid 150 are formed between the active device array substrate 110 and the opposite substrate 160. Hence, the fabrication of the electro-wetting display panel 100 is completed.

Figure 3:
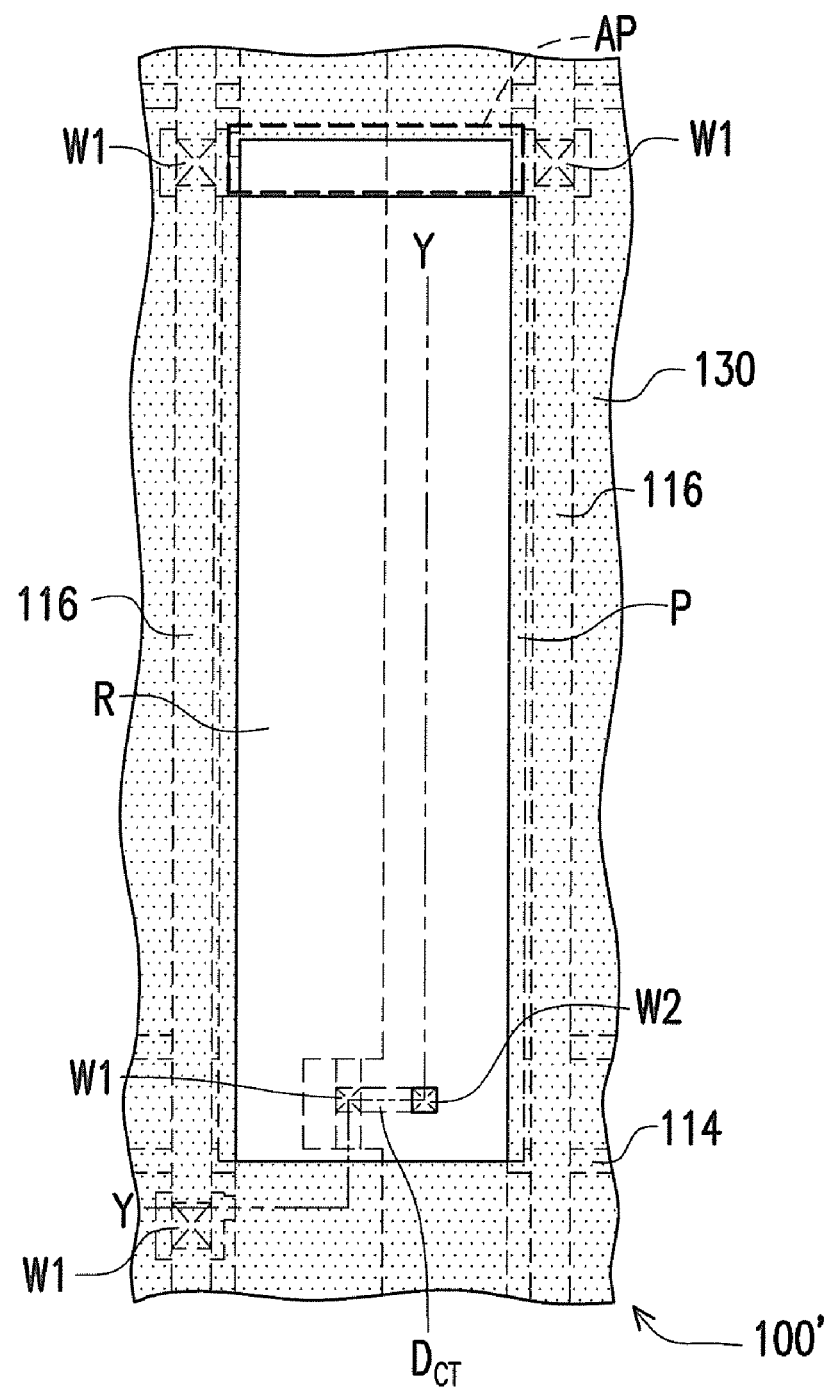
FIG. 3 and FIG. 3' are respectively a schematic top view and a schematic cross-sectional view of a single pixel in an electro-wetting display panel according to another embodiment of the present invention.
Figure 3:
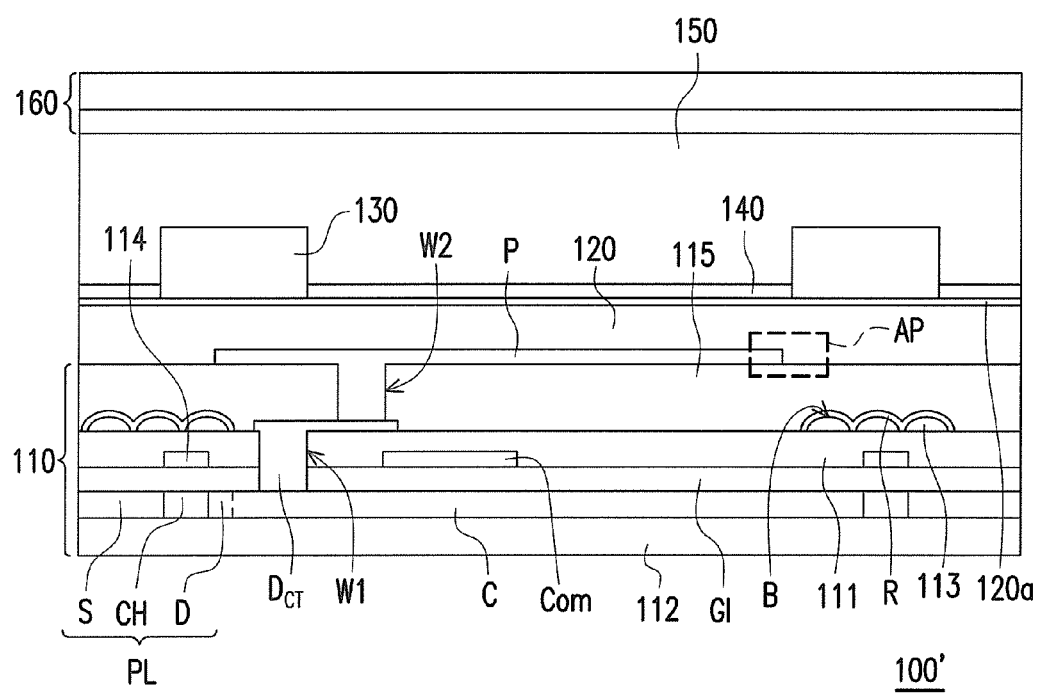

FIG. 3 and FIG. 3' are respectively a schematic top view and a schematic cross-sectional view of a single pixel in an electro-wetting display panel according to another embodiment of the present invention. Further, FIG. 3' is a schematic cross-sectional view along a line Y-Y' in FIG. 3. The electro-wetting display panel 100' of the present embodiment is similar to the electro-wetting display panel 100. The difference between the electro-wetting display panel 100' and the electro-wetting display panel 100 is that the bumps 113 and the reflective layer R in the electro-wetting display panel 100' do not distribute all over the display region. That is, the bumps 113 and the reflective layer R in the electro-wetting display panel 100' only distribute on a portion of the display region. In other words, the electro-wetting display panel 100' is a transflective-type electro-wetting display panel, and the electro-wetting display panel 100 shown in FIG. 1 is a reflective-type electro-wetting display panel.

Since the reflective layer in the electro-wetting display panel of the present embodiment has a bumpy surface, the present embodiment is capable of improving the reflectivity of the electro-wetting display panel to obtain a relatively better display quality. Moreover, portions of the embodiments of the present invention can speed up the response speed of the electro-wetting display panel by designing the pixel electrode.

What is claimed is:

1. An electro-wetting display panel comprising:
   an active device array substrate, comprising:
      a substrate;
      a plurality of scan lines;
      a plurality of data lines; and
      a plurality of pixels, wherein:
         each of the pixels is electrically connected with one of the scan lines and one of the data lines correspondingly;
         each of the pixels comprises an active device, a transparent pixel electrode and a reflective layer;
         the transparent pixel electrode is electrically connected with the active device and is located above the reflective layer; and
         the reflective layer has a bumpy surface;
      a dielectric layer disposed on the active device array substrate;
      a wall structure disposed on the dielectric layer or the active device array substrate;
   a first liquid containing dyes, the first liquid containing dyes being disposed on the dielectric layer;
   a second liquid; and
   an opposite substrate disposed over the active device array substrate, wherein the second liquid is located between the opposite substrate and the active device array substrate.

2. The electro-wetting display panel of claim 1, wherein the active device array substrate includes a thin film transistor array substrate.

3. The electro-wetting display panel of claim 2, wherein the active devices include amorphous silicon thin film transistors or polysilicon thin film transistors.

4. The electro-wetting display panel of claim 1, wherein the active device array substrate further comprises:

an inter-dielectric layer covering the active devices;

a plurality of bumps disposed on the inter-dielectric layer, wherein the reflective layer is disposed on the inter-dielectric layer to cover the bumps; and a planar layer disposed on the inter-dielectric layer to cover the reflective layer, wherein the transparent pixel electrodes are disposed on the planar layer and the dielectric layer is disposed on the planar layer to cover the transparent pixel electrodes.

5. The electro-wetting display panel of claim 1, wherein the each of the transparent pixel electrodes has at least an opening to expose at least a portion of the bumpy surface.

6. The electro-wetting display panel of claim 1, wherein the opposite substrate comprises a common electrode and a black matrix layer.

7. The electro-wetting display panel of claim 1, wherein the pixels include reflective pixels or transflective pixels.

8. The electro-wetting display panel of claim 1, wherein the dielectric layer has a hydrophobic surface, the wall structure is hydrophilic, the first liquid containing dyes is a non-polar liquid, and the second liquid is a polar conductive liquid.

9. The electro-wetting display panel of claim 1, wherein the dielectric layer has a hydrophilic surface, the wall structure is hydrophobic, the first liquid containing dyes is a polar conductive liquid, and the second liquid is a non-polar liquid.

10. An electro-wetting display panel comprising:
an active device array substrate, comprising:
a substrate;
a plurality of scan lines;
a plurality of data lines;
a plurality of pixels, wherein:
each of the pixels is electrically connected with one of the scan lines and one of the data lines correspondingly;
each of the pixels comprises an active device, a transparent pixel electrode and a reflective layer,
the transparent pixel electrode is electrically connected with the active device and is located above the reflective layer;
the reflective layer has a bumpy surface; and
at least a portion of the bumpy surface is arranged without being covered by
the transparent pixel electrode;
a dielectric layer disposed on the active device array substrate;
a wall structure disposed on the dielectric layer;
a first liquid containing dyes disposed on the dielectric layer;
a second liquid; and
an opposite substrate disposed over the active device array substrate, wherein the second liquid is located between the opposite substrate and the active device array substrate.

11. The electro-wetting display panel of claim 10, wherein the dielectric layer has a hydrophobic surface, the wall structure is hydrophilic, the first liquid containing dyes is a non-polar liquid, and the second liquid is a polar conductive liquid.

12. The electro-wetting display panel of claim 10, wherein the dielectric layer has a hydrophilic surface, the wall structure is hydrophobic, the first liquid containing dyes is a polar conductive liquid, and the second liquid is a non-polar liquid.

13. The electro-wetting display panel of claim 10, wherein the each of the transparent pixel electrodes has at least an opening to expose at least a portion of the bumpy surface.

14. The electro-wetting display panel of claim 10, wherein the pixels include reflective pixels or transflective pixels.

* * * * *